United States Patent
Cowelchuk

(10) Patent No.: US 6,875,390 B2
(45) Date of Patent: Apr. 5, 2005

(54) METHOD OF MANUFACTURING A VEHICLE TRIM COMPONENT

(75) Inventor: Glenn Cowelchuk, Chesterfield, MI (US)

(73) Assignee: Lear Corporation, Southfield, MI (US)

( * ) Notice: Subject to any disclaimer, the term of this patent is extended or adjusted under 35 U.S.C. 154(b) by 323 days.

(21) Appl. No.: 10/295,126

(22) Filed: Nov. 15, 2002

(65) Prior Publication Data

US 2004/0099988 A1 May 27, 2004

(51) Int. Cl.[7] .............................. B28B 7/22; B28B 1/14; B28B 1/32; B28B 3/10; B28B 1/00
(52) U.S. Cl. .................. 264/255; 264/250; 264/260; 264/263; 264/308; 264/309; 425/3
(58) Field of Search ............................ 425/3; 264/250, 264/255, 259, 260, 263, 308, 309

(56) References Cited

U.S. PATENT DOCUMENTS

| 4,251,476 A | * | 2/1981 | Smith ........................ 264/46.7 |
| 4,273,800 A | | 6/1981 | Reid |
| 4,935,174 A | | 6/1990 | Suzuki |
| 5,007,814 A | | 4/1991 | Saunders et al. |
| 5,472,539 A | * | 12/1995 | Saia et al. ................... 156/155 |
| 5,962,082 A | | 10/1999 | Hendrickson et al. |
| 6,056,526 A | | 5/2000 | Sato |
| 6,149,857 A | | 11/2000 | McArdle et al. |
| 6,227,835 B1 | | 5/2001 | Bazzica |
| 6,302,669 B1 | | 10/2001 | Nishizawa et al. |
| 6,338,618 B1 | | 1/2002 | Van Ert et al. |
| 2001/0028131 A1 | | 10/2001 | Brodi, Jr. et al. |
| 2002/0066976 A1 | | 6/2002 | Cloutier et al. |

* cited by examiner

*Primary Examiner*—Stephen J. Lechert, Jr.
(74) *Attorney, Agent, or Firm*—Bill C. Panagos

(57) ABSTRACT

A method of making a multi-layered trim component for attachment to a structure of a vehicle is disclosed herein. The method includes providing a mold having a cavity formed therein which defining first and second surfaces. The mask is magnetically secured to the mold to cover the first surface. A first material is applied in the cavity so as to form a first layer conforming to the second surface. The mask is removed from the cavity of the mold. A second material is then applied in the cavity so as to form a second layer conforming to the first surface, wherein the first and second layers define a multi-layered trim component.

19 Claims, 3 Drawing Sheets

METHOD OF MANUFACTURING A VEHICLE TRIM COMPONENT

BACKGROUND OF THE INVENTION

This invention relates in general to a method of manufacturing a vehicle trim component, and in particular to a method of manufacturing an outer skin layer of an instrument panel.

Virtually all passenger vehicles include an instrument panel generally positioned underneath the windshield and attached to the frame of the vehicle behind the engine compartment. Generally, the ends of the instrument panel are attached to lateral side members of the frame of the vehicle. The instrument panel encloses various vehicle components, such as electrical and ventilation systems, audio systems, vehicle instrument gauges, displays, and auxiliary compartments.

Typically, the instrument panel is made of a main body having an outer skin layer. The main body is usually made of a plastic material or a composite of plastic and metal to provide structural rigidity for the instrument panel and provide attachment and mounting locations for the various vehicle components mounted thereon. The outer skin layer is typically thin and flexible and is attached, such as by an adhesive, to the main body. The skin layer provides a desired visual and tactile aesthetically pleasing covering for the instrument panel.

The skin layers are commonly made of a relatively thin outer paint layer, and a thicker backing layer. The paint layer generally provides the desired color, texture, and grain of the skin, while the backing layer provides the desired elastic tactile desired quality of the skin. In the past it was known to manufacture the skin by first spraying a liquefied paint material onto a countered surface of a mold tool to form the outer paint layer. The contoured surface corresponds to the shape of the main body of the instrument panel. The backing layer, such as a polyurethane material, is then sprayed over the paint layer. The skin is then attached to the main body of the instrument panel.

It is also known to manufacture a multi-layer or "two tone" skin layer having two or more color and texture outer paint layer portions. To manufacture the multilayer skin layer, a mask is placed over a first portion of the mold cavity, and then the first paint layer is sprayed on the exposed portion corresponding to the first color of the skin. The force of gravity holds the mask against the surfaces of the mold cavity. The mask is then removed and the second paint layer is sprayed on the remaining exposed portion of the cavity to form the second color of the skin. The backing layer is then sprayed on both paint layers to form the skin. Although this method has been somewhat satisfactory, the mask can be lifted up off the mold tool by the spray of the material directed in the mold cavity.

BRIEF SUMMARY OF THE INVENTION

This invention relates to a method of manufacturing a multi-layered trim component for a vehicle, and more preferably an outer skin layer for attachment to a main body of an instrument panel. The method includes providing a mold having a cavity formed therein which defining first and second surfaces. The mask is magnetically secured to the mold to cover the first surface. A first material is applied in the cavity so as to form a first layer conforming to the second surface. The mask is removed from the cavity of the mold. A second material is then applied in the cavity so as to form a second layer conforming to the first surface, wherein the first and second layers define a multi-layered trim component.

Various objects and advantages of this invention will become apparent to those skilled in the art from the following detailed description of the preferred embodiment, when read in light of the accompanying drawings.

DETAILED DESCRIPTION OF THE INVENTION

Figure 1:
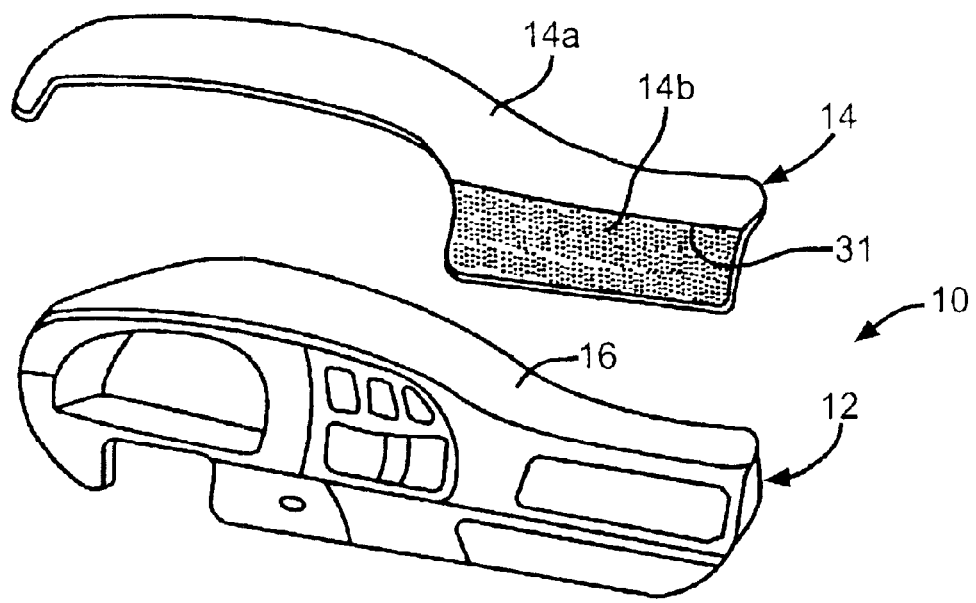
FIG. 1 is an exploded perspective view of an instrument panel having an outer skin layer manufactured in accordance with the present invention.

Referring now to the drawings, there is illustrated in FIG. 1, an instrument panel, indicated generally at 10. The instrument panel 10 is mounted in a vehicle and positioned underneath the windshield and attached to the frame of the vehicle behind the engine compartment. Generally, the ends of the instrument panel 10 are attached to lateral side members of the frame of the vehicle. The instrument panel 10 encloses various vehicle components, such as electrical and ventilation systems, audio systems, vehicle instrument gauges, displays, and auxiliary compartments.

The instrument panel 10 generally includes a main body portion 12 and an outer skin 14. The main body 12 can be made of any suitable material, such as plastic, metal, or composite, for providing structural integrity. The main body 12 also provides attachment and mounting locations for the carious components mounted therein and thereon. The skin 14 is attached to an outer surface 16 of the main body, such as by an adhesive. The skin 14 is preferably relatively thin and flexible and provides a desired visual and tactile aesthetically pleasing covering for the instrument panel 10. For example, it is preferred that the skin 14 has a grain or textured surface and is also relatively soft or elastic. The skin 14 can cover the entire outer surface 16 of the main body 12 or only a portion thereof. The skin includes at least two different outer surface portions 14a and 14b. The portions 14a and 14b have different color, texture, or grain patterns to provide a multi-colored or textured appearance.

There is illustrated in FIGS. 2 through 6 a preferred method of manufacturing the skin 14. It should be understood that although the method as shown and described herein is ideally suited for the manufacture of the skin 14 for an instrument panel 10, the invention can be practiced to manufacture any suitable vehicle trim component having multiple outer layers. For example, the method of the present invention can be used to manufacture door trim panels, seat panels, flooring, or any other interior trim component having multiple outer layers.

Figure 2:
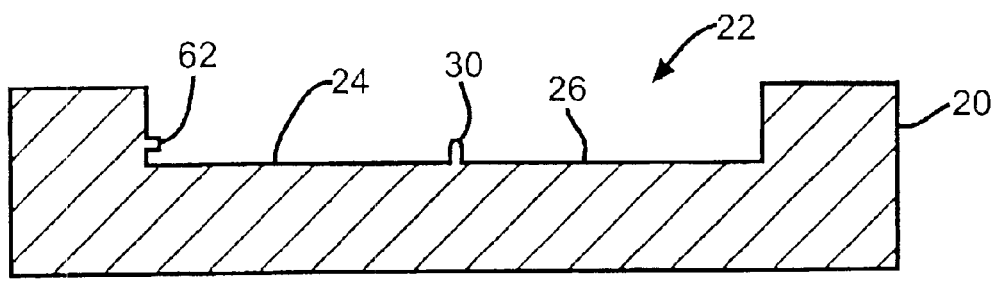
FIG. 2 is a schematical cross-sectional view of a mold tool for use in manufacturing the skin of the instrument panel illustrated in FIG. 1.

There is illustrated in FIG. 2 a mold tool, indicated schematically and generally at 20. The mold tool 20 includes a recess formed therein defining a cavity 22. The contour of the surfaces defining the cavity correspond to the contoured shape of the skin 14. The mold tool 20 defines a first surface 24 and a second surface 26. The surfaces 24 and 26 can have any contoured shape and textured pattern formed therein. The surfaces 24 and 26 correspond to the different surface portions 14a and 14b. The mold tool 20 preferably includes a feature for dividing the first and second surfaces 24 and 26. Preferably, the feature is a generally thin walled upwardly extending divider 30 between the first and second surfaces 24 and 26. The position of the divider 30 defines a parting line 31 between the surface portions 14a and 14b. The divider 30 extends along the cavity 22 of the mold to define the parting line 31. Preferably, the divider 30 has a relatively thin width W, such as about 2 mm., and a height at least as tall as the thickness of the paint layers, as will be explained below. The divider 30 can be integrally formed in the mold tool 20 or can be a separate attachment mounted thereon. Alternatively, the feature for dividing the first and second surfaces could be a depression in the surface of the mold cavity which receives a portion of the mask, such as the magnet. In yet another alternative embodiment, the surface of the mold tool defining the parting line could be flush, and the mask is simply rested on the surfaces. Thus, the mold tool may not include any structural feature defining a divider.

Figure 3:
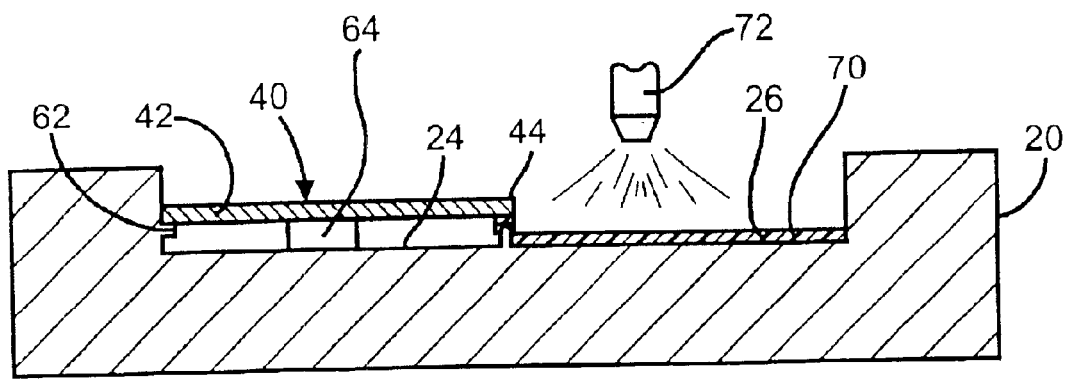
FIG. 3 is a schematical cross-section of the mold tool of FIG. 2 illustrating a step in the method of manufacturing the skin of the instrument panel, wherein a mask is positioned in the mold cavity and a first paint layer is sprayed therein.
Figure 4:
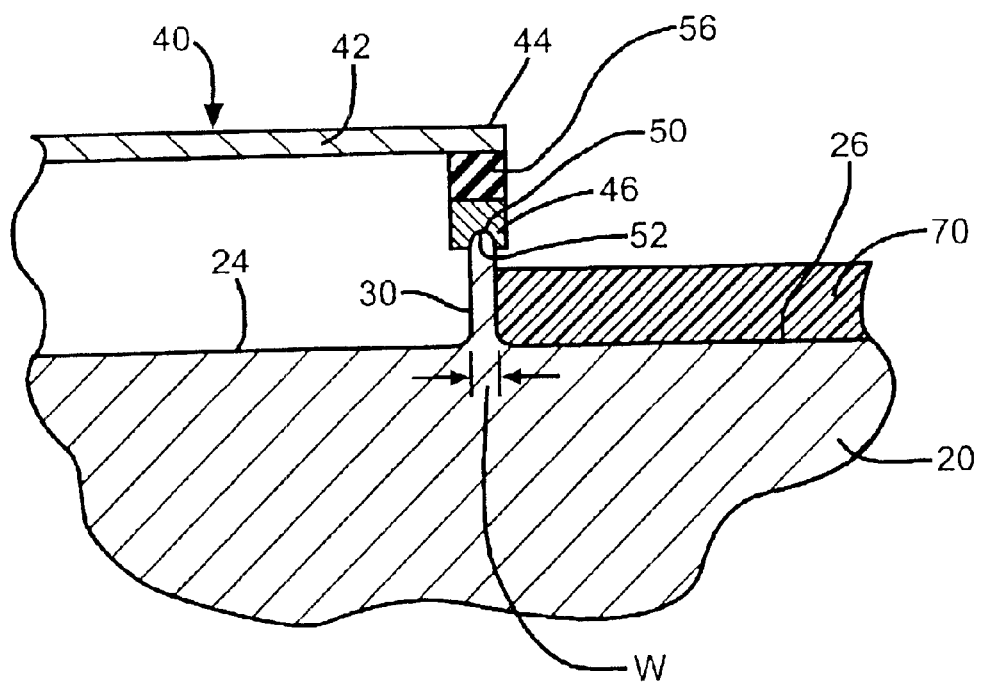
FIG. 4 is an enlarged schematic sectional view of a portion of the mold tool and mask illustrated in FIG. 3.

A mask, indicated generally at 40 in FIGS. 3 and 4, is used to assist in the manufacture of the skin 14 of the instrument panel 10 in accordance with the present invention. The mask 40 includes a main portion 42 and a peripheral edge 44. The main portion 40 is sized to cover the first surface 24 of the cavity 22. The peripheral edge 44 is sized corresponding to the divider 30. The peripheral edge 44 includes a magnet 46. The magnet 46 may be a permanent magnet or an electromagnet. The divider 30 is preferably formed of a magnetically attractive material. The magnetic coupling of the magnet 46 and divider 30 helps to secure the mask relative to the mold tool 20. Preferably, a generally air-tight seal is created between an upper portion 50 of the divider 30 and a lower portion 52 of the magnet 46. The upper portion 50 and the lower portion 52 can have any suitable mating shapes to facilitate a seal therebetween. The magnet 46 can be a magnetic strip extending along the entire length of the divider 30 or only a portion thereof. Alternatively, a plurality of magnets 46 may be mounted on the peripheral edge of the mask 40. It should be understood that a direct contact between the upper portion 50 of the divider 30 and the lower portion 52 of the magnet 46 is not required, and the magnet 46 may be spaced from the divider 30. For example, an elastic covering layer (not shown) can be attached to the lower portion 52 of the magnet 46. The mask 40 and the mold tool 20 may be made of any suitable materiel, such as nickel.

In a preferred embodiment of the mask 40, the magnet 46 is mounted on the mask 40 by a flexible layer 56 disposed between the magnet 46 and the peripheral edge 44 of the mask 40. The flexible layer 56 permits movement of the magnet 46 relative to the main portion 40 of the mask to compensate for tolerance variation between the peripheral edge 44 of the mask 40 and the divider 30. Thus, the mask can be properly aligned with the divider 30 by the minor shifting movement of the magnet 46. Alternatively, the magnet 46 may be made of a flexible material which permits movement of the lower portion 52 of the magnet relative to the divider 30.

To support other peripheral edges, such as the edge 60 of the mask 40, the mold tool 20 may include a ledge 62 formed therein. Other magnets may also be used to support any desired portion of the mask 40 relative to the mold tool 20. For example, a magnet 64 may be attached to the mask 40 for magnetically coupling the main portion 42 to the first surface 24 of the mold tool 20. The magnet 64 may be formed as an extension block extending downwardly from the main portion 42 and having a magnetically charged end portion for engaging with the first surface 24. It should be understood that the term "magnet" used herein can be any material or component which is able to produce an attracting magnetic field.

Figure 5:
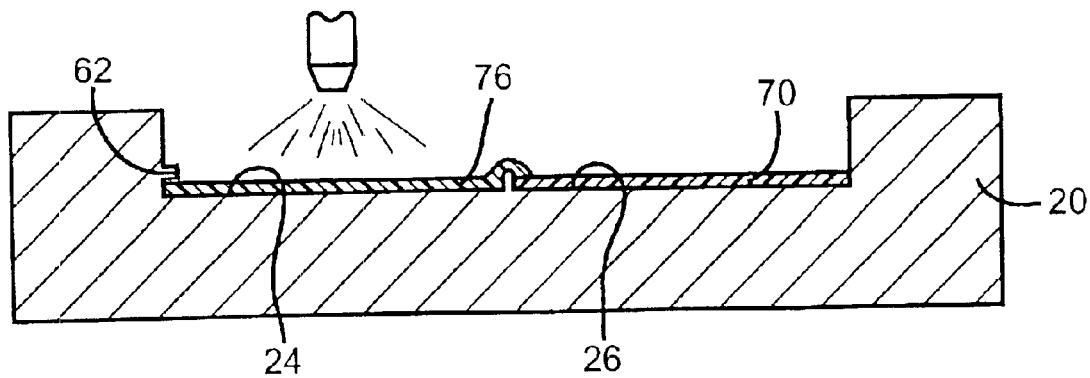
FIG. 5 is a schematical cross-section of the mold tool of FIG. 2 illustrating a another step in the method of manufacturing the skin of the instrument panel, wherein the mask has been removed from the mold cavity and a second paint layer is sprayed therein.
Figure 6:
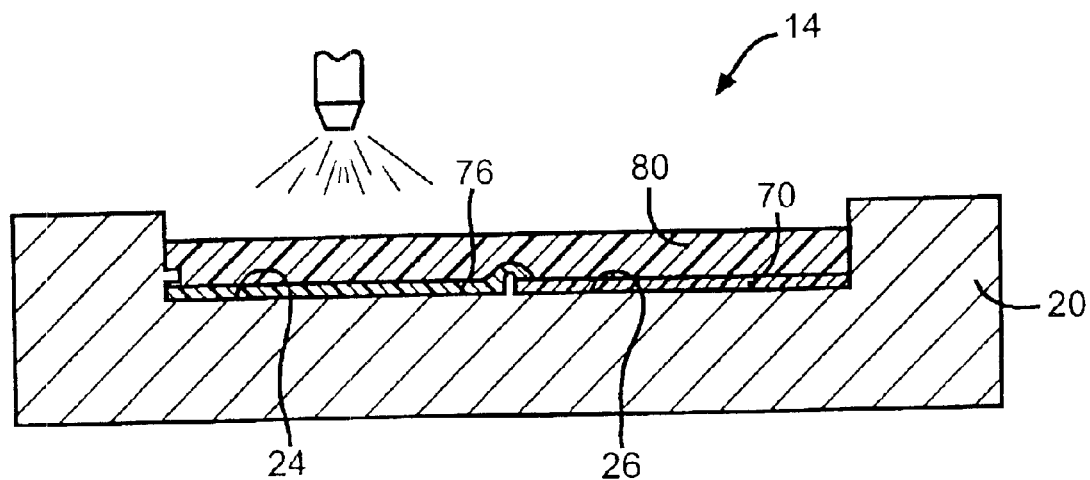
FIG. 6 is a schematical cross-section of the mold tool of FIG. 2 illustrating yet another step in the method of manufacturing the skin of the instrument panel, wherein a third material is sprayed on top of the first and second paint layers to form the skin.

The manufacture of the skin 14 will be described. As shown in FIG. 3, the mask 40 is positioned in the cavity 22 such that the peripheral edge 44 of the mask 40 engages and is magnetically coupled to the divider 30 so as to cover the first surface 24. A first paint material is applied to the second surface 26 to create a first paint layer 70. The first paint material can be applied to the second surface 26 by any suitable manner. Preferably, the first paint material is initially liquefied and is sprayed onto the second surface 26 from a nozzle 72. The first paint material can then be cured or otherwise set to a generally hardened condition. The mask 40 prevents the sprayed first paint material from being applied to the first surface 24. The mask 40 is then removed from the cavity 22. A second paint material is then applied to the first surface 24 to create a second paint layer 76, as shown in FIG. 5. Likewise, the second paint material can be applied to the first surface 24 by any suitable manner, but is preferably sprayed thereon. The second paint material may be sprayed in the cavity 22 such that the second paint layer 76 overlaps the first paint layer 70. Thus, a mask is not necessarily required to shield the first paint layer 70. Alternatively, a second mask (not shown) conforming to the dimension of the second surface 26 may be used to cover the second surface 26 during the spraying operation.

The paint materials can be applied by any suitable manner, such as by spraying as shown and described herein. Alternatively, the paint materials may be applied by directing powdered paint materials onto the respective surfaces of the mold tool 20. The paint material can be any material having suitable wear and adhesion properties for the skin 14. An example of a suitable paint material is a one component or multi-component urethane paint.

A third material is then applied over at least a portion of the first and second paint layers 70 and 76 to form a backing layer 80. A suitable material for forming the backing layer 80 is a polyurethane material. The backing layer 80 is preferably applied by spraying. Preferably, the paint layers 70 and 76 are relatively thin compared to the backing layer 80. For example, the paint layers 70 and 76 can have a thickness of about 0.001 mm thick, and the backing layer 80 may have a thickness of about 0.08 mm to about 1.2 mm.

The first and second paint layers 70 and 76 and the backing layer 80 form the skin 14, which can be removed from the cavity 22 of the mold tool 20. Portions of the layers 70, 76, and 80 can be trimmed off is necessary. Preferably, the divider 30 is thin enough so that the parting line 31 between the first and second paint layers 70 and 76 form or abut together to create an aesthetically pleasing seam line. Alternatively, a seam strip (not shown) may be attached over the paring line 31. After removal of the skin 14 from the mold tool 20, the backing layer 80 is preferably adhesively attached to the outer surface 16 of the main body 12.

Although the skin 14 and the manufacture thereof was shown and described as having two paint layers, it should be understood that the skin 14 may be created with three or more layers manufactured by a manner similar to that described above, wherein a mask is used to mask off the appropriate surfaces of the cavity 22 of the mold tool 20.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of making a multi-layered trim component for attachment to a structure of a vehicle comprising the steps of:
    a. providing a mold having a cavity formed therein defining first and second surfaces;
    b. magnetically securing a mask to the mold to cover the first surface;
    c. applying a first material in the cavity so as to form a first layer conforming to the second surface;
    d. removing the mask from the cavity of the mold; and
    e. applying a second material in the cavity so as to form a second layer conforming to the first surface, wherein the first and second layers define a multi-layered trim component.

2. The method of claim 1 further including the step of applying a third material over the first and second materials subsequently to step (e).

3. The method of claim 2, wherein the third material is sprayed over the first and second materials.

4. The method of claim 2, wherein the third material is comprised of polyurethane.

5. The method of claim 1, wherein one of the first and second materials is a urethane based paint.

6. The method of claim 1, wherein in step (c) the first material is applied in the cavity by spraying onto the first surface.

7. The method of claim 1, wherein in step (e), the second material is applied in the cavity by spraying onto the second surface.

8. The method of claim 1, wherein the second material is sprayed on top of the first layer such that a portion of the second material overlaps the first material.

9. The method of claim 1, wherein the mold includes a divider separating the first surface from the second surface.

10. The method of claim 9, wherein the mask includes a magnet on an edge thereof, and wherein the mask is magnetically secured to the mold in step (b) by placing the magnet along the divider, thereby creating a seal between the divider and the mask.

11. The method of claim 10, wherein the magnet is a permanent magnet.

12. The method of claim 10, wherein the magnet is an electromagnet.

13. The method of claim 10, wherein the magnet is movably mounted on the mask to permit movement of the magnet relative to the mask.

14. The method of claim 13, wherein the mask further includes a flexible material mounted between the magnet and the edge of the mask to permit movement of the magnet relative to the mask.

15. The method of claim 13, wherein the magnet is made of a flexible material.

16. The method of claim 10, wherein the mask further includes a second magnet located in a spaced relationship relative to the edge of the mask and magnetically attracted to a portion of the mold for assisting in securing the mask to the mold.

17. The method of claim 9, wherein the divider is a projection extending upwardly from one of said first and second surfaces.

18. A method of making a skin for an instrument panel of a vehicle comprising the steps of:
    a. providing a mold having a cavity formed therein defining first and second surfaces;
    b. magnetically securing a mask to the mold to cover the first surface;
    c. spraying a first material in the cavity so as to form a first paint layer conforming to the second surface;
    d. removing the mask from the cavity of the mold;
    e. spraying a second material in the cavity so as to form a second paint layer conforming to the first surface; and
    f. spraying a third material over the first and second materials, thereby forming the skin.

19. A tool for forming a panel for attachment to a structure of a vehicle comprising:
    a base mold having a cavity defining first and second surfaces, said base being made of a magnetically attractive material and including a divider extending upwardly from one of said first and second surfaces; and
    a mask having a masking portion and a contact portion, said contact portion including a magnet and shaped to correspond with said divider for providing a seal between said divider and said masking portion when said mask is position in said cavity of said mold.

* * * * *